United States Patent [19]

McElroy

[11] Patent Number: 5,336,297

[45] Date of Patent: Aug. 9, 1994

[54] PROCESS FOR THE TREATMENT OF ELECTRIC ARC FURNACE DUST

[75] Inventor: Roderick O. McElroy, Vancouver, Canada

[73] Assignee: Terra Gaia Environmental Group Inc., Vancouver, Canada

[21] Appl. No.: 18,032

[22] Filed: Feb. 16, 1993

[51] Int. Cl.$^5$ .............................................. C22B 3/46
[52] U.S. Cl. .................................. 75/725; 75/961; 204/118; 204/128; 423/94; 423/100; 423/140; 423/141
[58] Field of Search ............... 423/98, 109, 140, 141, 423/94, 100; 75/725, 961; 204/118, 128

[56] References Cited

U.S. PATENT DOCUMENTS

| | | | |
|---|---|---|---|
| 4,610,721 | 9/1986 | Duyvesteyn et al. | 75/101 |
| 4,610,722 | 9/1986 | Duyvesteyn et al. | 75/204 |
| 4,614,543 | 9/1986 | Duyvesteyn et al. | 423/98 |
| 4,888,053 | 12/1989 | Grayson et al. | 423/109 |

Primary Examiner—Melvyn J. Andrews
Attorney, Agent, or Firm—Elbie R. de Kock

[57] ABSTRACT

In a process for the treatment of electric arc furnace (EAF) dust, the dust is first subjected to atmospheric leaching with a ferric chloride solution and thereafter subjected to treatment in an autoclave at an elevated temperature and pressure for conversion of low temperature stable goethite (FeO·OH) to a filterable crystalline hematite ($Fe_2O_3$) in an acidic chloride solution. Zinc is recovered from the solution by solvent extraction using a solvating extractant followed by stripping and zinc recovery by electrolysis of zinc chloride solution. Lead is separated from the solution by cooling to precipitate lead chloride.

14 Claims, 2 Drawing Sheets

PROCESS FOR THE TREATMENT OF ELECTRIC ARC FURNACE DUST

FIELD OF THE INVENTION

This invention relates to a process for the treatment of Electric Arc Furnace (EAF) dust.

BACKGROUND OF THE INVENTION

In the recycling of scrap metal, the electric arc furnace process, in which the scrap metal is melted by forming electric arcs between graphite electrodes and the scrap metal, is commonly used. High quality steels can be made by this process. However, during the recycling process, zinc and other non-ferrous metals, present in the scrap metal, as well as some of the iron, are "evaporated" forming minute particles of the oxides of these metals. These particles settle as dust in the electric arc furnace flues. The dust is unsuitable for recycling due to the buildup of the non-ferrous content which has a deleterious effect on the steel produced. Typically, the dust contains about 25 per cent zinc, 25 per cent iron, 5 per cent lead, some tin, cadmium, chromium and copper, the remainder being silica, lime and alumina.

The disposal of this dust has become a major problem for steel producers as, due to the strict environmental legislation in countries such as Canada and the U.S., the dust can no longer be simply disposed of as landfill because of the constant danger of the toxic or hazardous metal components thereof, such as lead, chromium and cadmium, being leached out by rain or underground water to contaminate rivers, lakes and other natural resources. Hence, the treatment of the dust to remove the hazardous or toxic metals therefrom so that it can safely be used as landfill has become a priority. In order to carry out the treatment on an economical basis, an effort has been made to render the process feasible by remarketing of the non-ferrous metals removed from the dust during treatment, notably zinc and, to a lesser extent, lead. However, efforts in this direction have so far not been entirely successful.

It is accordingly an object of the present invention to provide a process for the treatment of EAF dust which is economically feasible.

SUMMARY OF THE INVENTION

According to the invention, there is provided a process for the treatment of electric arc furnace dust, comprising the steps of leaching the flue dust with a leach solution containing ferric chloride to produce a slurry containing a hydrous iron oxide; and converting the hydrous iron oxide to a filterable hematite by heat treatment of the slurry at an elevated pressure.

Also according to the invention, there is provided a process for the treatment of electric arc furnace dust, comprising the steps of leaching the flue dust with a leach solution containing ferric chloride to produce a slurry containing a hydrous iron oxide and to dissolve zinc present in the furnace dust to produce a zinc chloride solution; and separating the zinc chloride from the solution by solvent extraction using a solvating extractant.

Further according to the invention, there is provided a process for the treatment of electric arc furnace dust, comprising the steps of reacting the dust with ferric chloride at an elevated temperature and pressure to produce a filterable hematite residue and to dissolve lead and zinc present in the flue dust to form a solution containing zinc chloride and lead chloride; and separating the zinc chloride from the solution by solvent extraction using a solvating extractant.

BRIEF DESCRIPTION OF THE DRAWINGS

The invention will now be described, by way of an example, with reference to the accompanying drawings, in which.

DETAILED DESCRIPTION OF PREFERRED EMBODIMENT

Figure 1:
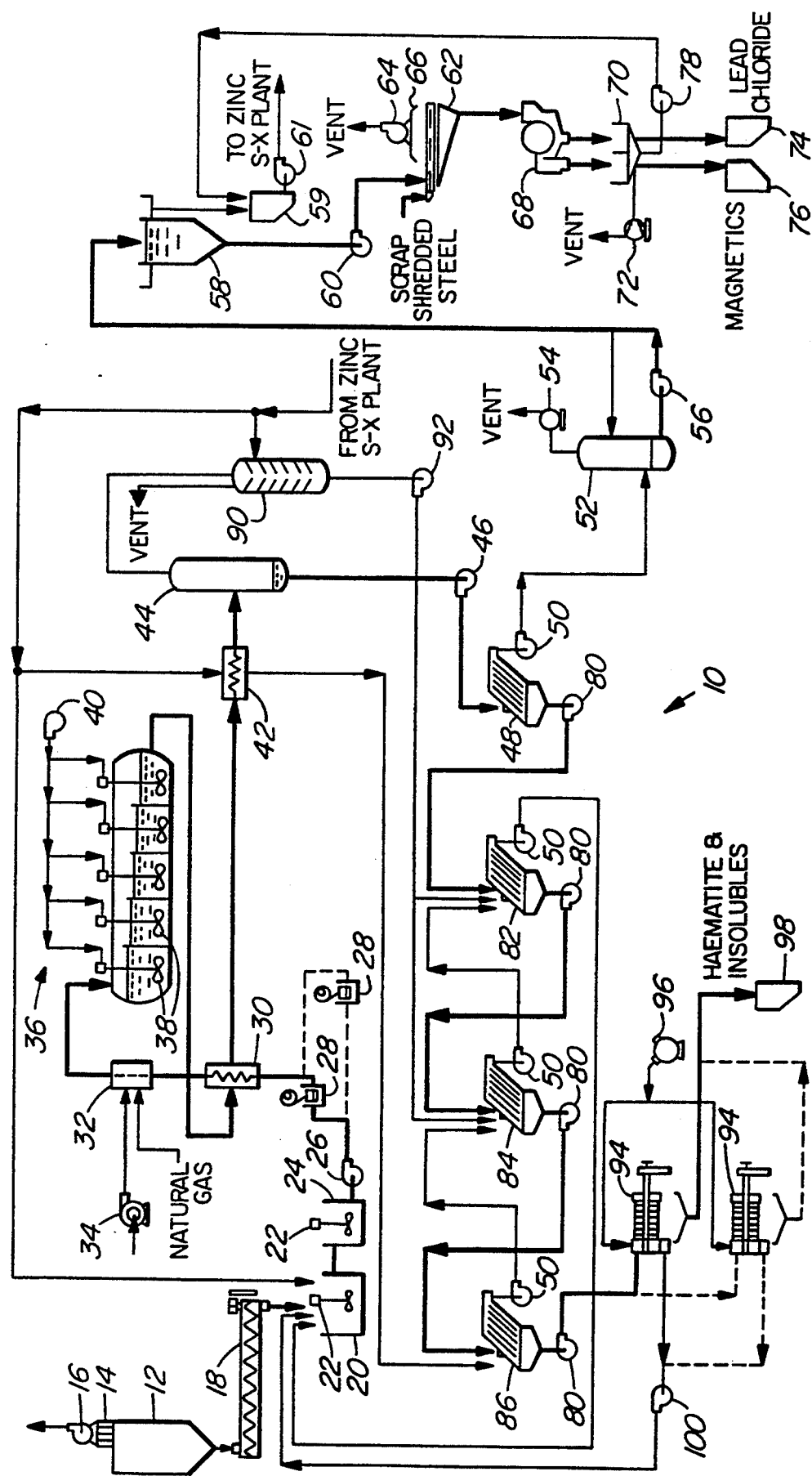
FIG. 1 is a flow diagram of an autoclave circuit of a plant for treating EAF dust.

In the description below an overview of the process is given first. Thereafter, the process is described with reference to the drawing.

The first step in the process is the leaching of the flue dust in a ferric chloride solution at atmospheric pressure. The dust is delivered to a mixing tank in which it is mixed with a ferric chloride ($FeCl_3$) solution. Hydrolysis of the ferric chloride produces hydrochloric acid which dissolves the zinc oxide (ZnO) and lead oxide (PbO) present in the dust. The reaction can be summarized by the following equation:

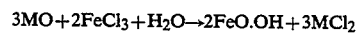

$$3MO + 2FeCl_3 + H_2O \rightarrow 2FeO.OH + 3MCl_2$$

where M = zinc or lead.

The concentration of the $FeCl_3$ in the solution should be sufficient to provide the stoichiometric amount of $Fe^{3+}$ required to completely dissolve all the zinc and lead oxide as well as to leave a surplus of $Fe^{3+}$ (5 g/L iron as $FeCl_3$) to maintain acidity.

The leach solution should also contain at least 140 g/L of chloride, but higher levels up to saturation are acceptable. This is required for the zinc extraction step which will be described below. As sources of chloride, calcium, sodium or potassium chlorides are all suitable, either alone or in combination. For a typical EAF dust, an initial leach pulp solids content of 100 g/L and ferric chloride content of 35 to 40 g/L (as $FeCl_3$) is considered to be near optimal. Higher ratios of $FeCl_3$ to MO can be used but a large excess of ferric chloride will interfere with zinc solvent extraction. The extra chloride can be provided, for example, as calcium chloride at a concentration of about 200 g/L (as $CaCl_2$).

The atmospheric leach has been tested at temperatures from 5° C. to 104° C. (atmospheric boiling point). Due to the subsequent high temperature conditioning, the temperature of the atmospheric leach does not appear to be of any particular importance. It has been found that an initial slurry solids content in the range of 100 g/l provides an acceptable pulp viscosity. It is expected that a solids content of about 200 g/L is probably a reasonable upper limit.

The second step in the process is the conditioning of the slurry. The hydrous iron oxide slurry produced by the atmospheric leach is very slow settling and difficult to filter. In the conditioning step, the slurry from the atmospheric leaching step is treated in a pressure vessel or autoclave to convert the hydrous iron oxide slurry to a crystalline settleable and filterable residue. The leached slurry is heated in the autoclave to a temperature of at least 140° C. and is maintained in the autoclave for a residence time of at least 30 minutes. At higher temperatures, shorter residence times may be acceptable.

The mechanism by which the slurry is conditioned (i.e. rendered settleable and filterable) is conversion of the low temperature stable goethite (FeO·OH) or hydrous iron oxide to crystalline hematite (Fe$_2$O$_3$) at temperatures above 140° C. in an acidic chloride solution. The reaction can be summarized as follows:

$$2FeO\cdot OH \rightarrow Fe_2O_3 \downarrow + H_2O$$

The next step in the process is a liquid/solids separation step which involves hot filtration of the conditioned slurry with brine washing to produce a residue (principally iron oxide) which is low enough in toxic or hazardous heavy metals to be commercially utilized, e.g., as a pigment, or to be safely landfilled. Options for the treatment of the conditioned slurry comprise a hot direct filtration/washing; a hot thickening-filtration-washing; and a counter current decantation (CCD) washing, followed by filtration. The preferred option is a three-stage CCD washing with process solution followed by filtration and a water displacement wash. The criteria for selecting a three-stage CCD followed by filtration involve maximization of zinc and lead recovery combined with minimization of dilution by added wash water. Added wash water must be at least partly removed from the circuit by evaporation, with attendant energy cost. Effective removal of lead requires washing with hot chloride brine solution, since the lead chloride formed by hydrochloric acid leaching has low solubility in water. Reheated chloride brine recycle from the zinc solvent extraction is a suitable wash liquor and, under normal circumstances, a combination of CCD plus filtration will provide an economically optimum recovery of both heavy metals and brine. Where lack of space for thickeners or other factors make CCD less attractive, the same effect can be achieved by staged washing on a belt filter.

During execution of the above steps, it is important to maintain the pulp, the solution and the filter cake at a temperature above 80° C. to counteract the precipitation of lead chloride.

Lead can be separated from the solution by cooling to precipitate lead chloride. The lead chloride is then allowed to settle to produce a dense pulp which can be filtered and then reacted with scrap iron (cementation) in a small vessel to produce crude lead which can be further refined:

$$Fe^0 + PbCl_2 \rightarrow Pb^0 + FeCl_2$$

Zinc is recovered by the separation of zinc chloride from the solution by solvent extraction using a solvating extractant followed by water stripping and zinc recovery by electrolysis of zinc chloride solution, which also regenerates chlorine.

The removal of zinc from the leach solution by solvating extractant requires the high (140 g/L or higher) chloride concentration already referred to above. As stated above, zinc leaves the leach solution as ZnCl$_2$ which is solvated by the organic extracting reagent. This extraction is favoured by high chloride content in the leaching brine. A suitable extractant has been found to be ACORGA ZNX50 ™, although it is conceivable that other suitable solvating extractants may be used. The extractant selectively forms complexes with the zinc chloride and since the extractant is immiscible with water, it can be separated from the aqueous solution. Ideally, the zinc chloride can be recovered (stripped) from the extractant by contact with water to produce a pure zinc chloride solution for electrowinning of the zinc therefrom. However, in order to increase the conductivity of the solution for electrowinning, a weak, typically 30 gram per litre NaCl solution (chloride brine), is preferred. In the present example, a preferred method is stripping by spent electrolyte, i.e. dilute ZnCl$_2$ solution to which a minor amount of NaCl has been added to enhance the solution conductivity.

Zinc is recovered from the zinc chloride solution by electrolysis using a diaphragm cell, such as is used in the chloralkali industry. Zinc metal is formed at the cathode and chlorine gas is formed at the anode:

$$ZnCl_2(aq) \rightarrow Zn^0 + Cl_2 \uparrow$$

The chlorine gas from the anode compartment is vented through a scrubber where it is reacted with ferrous chloride from the lead cementation step to regenerate the ferric chloride leach solution:

$$2FeCl_2 + Cl_2 \uparrow \rightarrow 2FeCl_3$$

Any excess chlorine is reacted with scrap iron to form ferric chloride:

$$3Cl_2 \uparrow + 2Fe^0 \rightarrow 2FeCl_3$$

During the process, cadmium present in the dust accumulates in the circulating solution. When it reaches a concentration which interferes with washing, a bleed stream is treated with a water soluble sulphide, such as sodium sulphide, at atmospheric pressure to precipitate the cadmium as a sulphide:

$$Na_2S + CdCl_2 \rightarrow CdS \downarrow + 2NaCl$$

As far as the reagents used in the process are concerned, the process consumes scrap iron which exits as hematite. Except for incomplete washing of the leach residue and any deliberate bleed, the system is closed for chloride. Any required makeup of chloride can be by purchase of salt (NaCl), liquid chlorine, sodium chlorate or chloride pickle liquor. The latter is the preferred source of the first fill with chloride as well as make-up chloride, since, where it is locally available, it is generally a disposal problem and can thus be obtained at low or negligible cost.

Another consumable in the process is the zinc extraction reagent.

Figure 2:
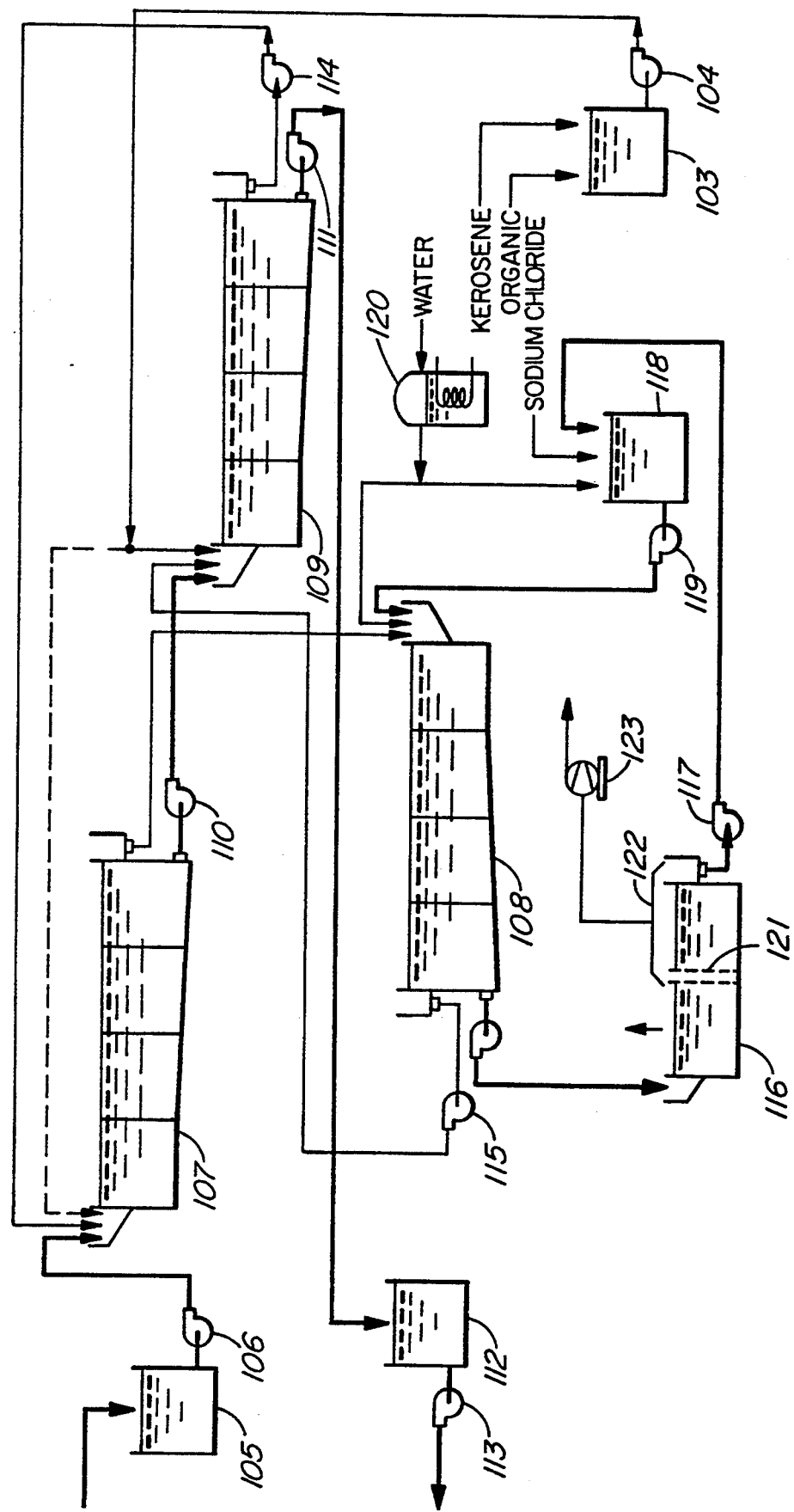
FIG. 2 is a flow diagram of a solvent extraction and electrowinning circuit of the plant of FIG. 1.

The apparatus by which the process is carried out will now be described with reference to FIGS. 1 and 2. In FIG. 1, reference numeral 10 generally indicates a system for the treatment of EAF dust, according to the invention.

Dry, size classified (de-gritted) EAF dust is delivered pneumatically to a storage bin or silo 12 equipped with a bag filter 14 and a fan 16 for venting air. From the silo 12, the dust is fed by means of a variable speed auger feeder 18 to a first mixing tank 20 which is provided with a butyl rubber covered agitator 22. The dust is discharged into the tank 20 via a sock (not shown). The tank 20 is covered to counteract splash loss and operates below 60° C. From the tank 20, the feed is to a second tank 24 also provided with a butyl rubber covered agitator 22. The tanks 20 and 24 contain the ferric chloride leach solution for the atmospheric leaching of the flue dust, which in the present example is effected in two stages. From the tank 24, the liquid/solid slurry is pumped by means of a chloride-proof pre-pressurization pump 26 and a high pressure diaphragm pump 28 to a shell and tube heat exchanger 30 where the slurry is pre-heated by indirect exchange with product before passing through a heater 32 which is heated by a suitable heat source, such as a natural gas burner 34, where the temperature is raised to 175° C. The slurry is then introduced into an autoclave (generally indicated at 36) which, in the present example, has five compartments, each provided with an agitator 38. Water feed to the autoclave 36 is by means of a high pressure gland water pump 40. Hydrous iron oxide in the residue is converted to the hematite form in the autoclave 36. In the present example, the heat treatment in the autoclave is shown as a continuous process, but it can also be effected batchwise, if desired.

From the autoclave 36 the slurry exits, driven by autoclave pressure, to the heat exchanger 30, where it exchanges heat with the incoming colder slurry, and to a second shell and tube heat exchanger 42 for further cooling, and through a control choke to a flash tank 44 where the slurry is flashed down to atmospheric pressure. The exhaust passes through a gas scrubber 90 to atmosphere. The slurry is then pumped by means of a flash tank slurry pump 46 to a lamella thickener 48 where leach solution containing the dissolved zinc and lead ions is separated from the solid residue. The separated liquid is pumped by means of a thickener overflow pump 50 to a lead chloride crystallizer 52 provided with a chloride-proof vacuum pump 54, where the lead is precipitated. From the lead chloride crystallizer 52, the slurry is pumped by means of a chloride-proof pump 56 to a lead chloride thickener tank 58, which, in the present example, comprises a cone-bottomed fibre reinforced plastic (FRP) vessel provided with a variable-speed chloride-proof diaphragm underflow pump 60. In the thickener 58 the liquid is separated from the precipitate. The overflow from the thickener tank 58 passes to a chloride-proof pump sump 59 from where the liquid is pumped by means of a chloride-proof pump 61 to a zinc solvent extraction plant (FIG. 2) for the recovery of zinc metal.

The precipitated lead chloride is pumped by the pump 60 to a lead cementation vessel 62 provided with a ventilation fan 64 and hood 66. Scrap metal is fed to the vessel 62 for lead cementation to take place. For this purpose the vessel 62 is provided with jigs (not shown) which are supplied on a batch basis with scrap metal. Overflow from the jigs returns to the vacuum crystallizer 52. From the vessel 62 the hutch concentrate (cement lead) passes via a magnetic separator 68 to a duplex pan filter 70 provided with a chloride-proof vacuum pump 72. A lead chloride tote 74 and a magnetic tote 76 are provided for respectively receiving the lead chloride and the magnetic material separated therefrom by the separator 68. The filtrate from the filter 70 is pumped by means of a filtrate pump 78 to the pump sump 59 to be combined with the overflow from the thickener tank 58.

The solids from the thickener 48 are pumped via a thickener underflow pump 80 to a three-stage CCD wash against reheated zinc solvent extraction raffinate with direct steam injection to maintain the temperature at 90° C. The three-stage CCD wash is provided for by three further lamella thickeners 82, 84 and 86, respectively, which are each also provided with an underflow pump 80 and an overflow pump 50. Thus, the solids from thickener 82 is pumped by its underflow pump 80 to the thickener 84 from where the solids is pumped by its underflow pump 80 to the thickener 86. As shown, zinc solvent extraction raffinate is recycled to the mixing tank 20 and part thereof passes via the heat exchanger 42 to the thickener 86 for the counter current wash. Zinc solvent extraction raffinate from the zinc solvent extraction plant is also pumped via a gas scrubber 90 by means of chloride-proof scrubber slurry pump 92 to the thickeners 84 and 86 for the counter current wash.

The liquid from the thickener 86 is pumped by its overflow pump 50 to the thickener 84 and likewise overflow liquid from the thickener 84 is pumped by its overflow pump 50 to the thickener 82. Overflow liquid from the thickener 82 is recycled by its overflow pump 50 to the mixing tank 20. From the fourth thickener 86, the solids residue is pumped by means of thickener underflow pump 50 to one of two batch filter presses 94 provided with an air compressor 96 where the hematite and other insolubles are filtered, water washed and passed to a tote bin 98. Filtered liquid from the filter presses 94 is recycled by means of a filter press filtrate pump 100 to the mixing tank 20.

The solvent extraction and electrowinning circuits will now be discussed with reference to FIG. 2.

The zinc chloride solution is pumped by the pump 61 to an FRP pregnant solution tank 105. The solution is then pumped by pump 106 to a primary organic contactor-separator 107. In the contactor 107, a 10% solution of ACORGA ZNX50 ™ in kerosene oil is added. The aqueous phase from the first contactor-separator 107 is pumped to a second contactor-separator 109 by means of a pump 110, where additional organic extractant is added. The organic/kerosene mixture is prepared in an organic mixing agitator 103 and pumped by means of transfer pump 104 to the first and second contactor-separators 107 and 109. Typically, the organic extractant is added at a rate of about 5800 litres per hour. The total residence time in the contactor-separators 107, 109 is about three minutes. The aqueous fraction from the second contactor 109 is pumped by means of a pump 111 to an FRP barren solution tank 112 from where it is pumped by pump 113 back to the autoclave circuit of FIG. 1 and specifically to the vessel 20 and the lamella thickeners 84 and 86. Conveniently, the pregnant and barren tanks 105 and 112 are large enough to allow the decoupling of the autoclave and the solvent extraction circuits.

The organic phase from the second contactor-separator 109 is recycled by means of pump 114 to the first contactor 107.

The organic phase from the first contactor-separator 107 is transferred to a stripping contactor-separator 108 where it is mixed with spent electrolyte containing sodium chloride at 65° C. in approximately a 3:1 organic to aqueous ratio. The stripped organic is recycled by means of pump 115 to the second contactor 109. The spent electrolyte is pumped from electrowinning cells 116 by means of pump 117 to a mix tank agitator 118 where make up sodium chloride is added when required and from where the mixture is pumped by pump 119 to the stripping contactor-separator 108.

A heater 120 is provided for heating the mixture to the required temperature.

In the present example, the electrowinning circuit comprises six cells, each consisting of 25 cathodes and 26 anodes. The cells are constructed of CPVC polymer concrete while the anodes are titanium sheet with a palladium coating and the cathodes are polished titanium sheet. The diaphragm 121 is of woven asbestos in order to keep the chlorine away from the cathodes.

The chlorine produced at the cathode is collected from the cells by hoods 122 and pumped by means of a chloride resistant vacuum pump 123 to the gas scrubber 44 of the autoclave. Sufficient sodium chloride is added to the circuit, at the stripping contactor-separator 108, in order to maintain the conductivity for electrolysis.

While only a preferred embodiment of the invention have been described herein in detail, the invention is not limited thereby and modifications can be made within the scope of the attached claims.

What is claimed is:

1. A process for the treatment of electric arc furnace dust comprising a mixture of zinc, iron and lead oxides, which comprises the steps of:

leaching the dust with a leach solution containing ferric chloride to produce a slurry containing a hydrous iron oxide; and converting the hydrous iron oxide to a filterable hematite by heat treatment of the slurry at an elevated pressure.

2. The process according to claim 1, wherein said heat treatment is carried out at a temperature of at least 140° C.

3. The process according to claim 1, further comprising the steps of:

dissolving zinc present in the dust during said leaching with said leach solution to provide a solution of zinc chloride; and separating the zinc chloride from the solution by solvent extraction using a solvating extractant.

4. The process according to claim 3, wherein said leach solution also contains a non-ferric chloride.

5. The process according to claim 4, wherein the concentration of ferric chloride in said leach solution is from about 35 to about 40 grams per litre.

6. The process according to claim 5, wherein the non-ferric chloride is selected from the group consisting of calcium chloride, sodium chloride and potassium chloride and having a chloride concentration of about 140 grams per litre.

7. The process according to claim 6, further comprising the step of dissolving lead present in the dust during said leaching of the slurry to provide a solution of lead chloride.

8. The process according to claim 7, further comprising the steps of subjecting the slurry to a liquid/solid separation step at a temperature of at least 80° C. to provide a residue containing hematite and a solution containing zinc chloride and lead chloride; and precipitating the lead chloride from the solution by cooling the solution to a temperature below 80° C.

9. The process according to claim 8, further comprising a cementation step of reacting the lead chloride in solution with scrap iron to produce lead metal and ferrous chloride.

10. The process according to claim 9, further comprising the steps of stripping the zinc chloride from the extractant to provide an aqueous zinc chloride solution and subjecting the zinc chloride solution to electrolysis to produce zinc metal and chlorine gas.

11. The process according to claim 10, further comprising the step of reacting the chlorine gas with the ferrous chloride formed during said cementation step to form ferric chloride and recycling said ferric chloride to said ferric chloride leaching step.

12. A process for the treatment of electric arc furnace dust comprising a mixture of zinc, iron and lead oxides, which comprises the steps of:

reacting the dust with ferric chloride at an elevated temperature and pressure to produce a filterable hematite residue and to dissolve lead and zinc present in the dust to form a solution containing zinc chloride and lead chloride; and separating the zinc chloride from the solution by solvent extraction using a solvating extractant.

13. The process according to claim 12, further comprising the step of, prior to reacting the dust with ferric chloride at an elevated temperature and pressure, leaching the dust with a leach solution containing ferric chloride at atmospheric pressure.

14. The process according to claim 13, wherein said elevated temperature is at least 140° C.

* * * * *